(12) United States Patent
Bhashetty et al.

(10) Patent No.: US 11,290,453 B2
(45) Date of Patent: Mar. 29, 2022

(54) SPLIT-TIERED POINT-TO-POINT INLINE AUTHENTICATION ARCHITECTURE

(71) Applicant: Bank of America Corporation, Charlotte, NC (US)

(72) Inventors: Mahesh Kumar Bhashetty, Plainsboro, NJ (US); Srinivasulu Bodapati, Hyderabad (IN); Rajesh Narayanan, Chennai (IN); Hemanth Prasad Mulpuru, Plano, TX (US); Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 341 days.

(21) Appl. No.: 16/509,589

(22) Filed: Jul. 12, 2019

(65) Prior Publication Data

US 2021/0014227 A1 Jan. 14, 2021

(51) Int. Cl.
*H04L 29/06* (2006.01)

(52) U.S. Cl.
CPC .................. *H04L 63/0892* (2013.01)

(58) Field of Classification Search
CPC ........... H04L 63/0892; H04L 2463/082; H04L 63/0884; H04L 63/0807
See application file for complete search history.

(56) References Cited

U.S. PATENT DOCUMENTS

| 7,778,262 | B2 | 8/2010 | Beagley et al. |
| 8,572,391 | B2 | 10/2013 | Golan et al. |
| 8,875,260 | B2 | 10/2014 | Zmener |
| 9,264,432 | B1 | 2/2016 | Liu et al. |
| 9,432,353 | B2 | 8/2016 | Zmener |
| 9,923,829 | B1 | 3/2018 | Liu et al. |
| 10,069,868 | B2 | 9/2018 | Smith et al. |
| 10,200,359 | B1 | 2/2019 | Sokolov et al. |
| 10,210,518 | B2 | 2/2019 | Alnajem |
| 10,237,070 | B2 | 3/2019 | Lindemann |
| 2003/0226037 | A1 | 12/2003 | Mak |
| 2013/0125226 | A1* | 5/2013 | Shah ............ H04L 63/0815 726/7 |
| 2013/0332998 | A1* | 12/2013 | Zmener ............ H04L 63/101 726/4 |
| 2017/0346851 | A1 | 11/2017 | Drake |

(Continued)

*Primary Examiner* — Ellen Tran
(74) *Attorney, Agent, or Firm* — Weiss & Arons LLP (57) ABSTRACT

Systems and methods for authenticating presumptively incompatible elements in a digital network are provided. A method may include receiving an access request from a client node in the network. The access request may be requesting access to an application in the network. The access request may be associated with a uniform resource identifier ("URI"). The method may include extracting a target application from the URI. The method may include determining an authentication protocol that is supported by the target application. The method may include generating, based on the authentication protocol, a series of one or more authentication tests that, in combination, satisfy the authentication protocol. The authentication tests may satisfy the authentication protocol even when the client node natively supports a different authentication protocol. The method may include executing the series of authentication tests to authenticate the client node vis-à-vis the target application.

20 Claims, 6 Drawing Sheets

(56) References Cited

U.S. PATENT DOCUMENTS

2018/0083941 A1* 3/2018 Thakkar ................ H04L 63/08
2018/0124049 A1* 5/2018 Lu ....................... H04L 9/3234
2019/0104127 A1   4/2019 Da Silva Peixoto et al.

* cited by examiner

SPLIT-TIERED POINT-TO-POINT INLINE AUTHENTICATION ARCHITECTURE

FIELD OF TECHNOLOGY

Aspects of the disclosure relate to digital networks. Specifically, aspects of the disclosure relate to systems and methods for authentication in digital networks.

BACKGROUND OF THE DISCLOSURE

Digital networks may include many elements that interact with each other. The elements may be native to the network. Some of the elements may be foreign to the network and may attempt to connect with or access one or more of the elements in the network.

When a first element initiates an interaction with a second element, the first element may need to authenticate itself to the second element. Authentication may be critical for the security of data in the network, which may be especially important for networks that contain sensitive data. The authentication may include a handshake. The authentication may be defined by one of many authentication protocols.

Typically, the first element may communicate directly with the second element, or with a proxy of the second element, for authentication. The direct communication may lead to vulnerabilities, such as an interception and redirection of the authentication communication.

Furthermore, a typical interaction may utilize an authentication protocol that is compatible with both the first and the second elements. When the first and second elements support authentication protocols that are by default incompatible with each other, it may be difficult to achieve authentication. It may be especially difficult when one element supports an authentication protocol that is weaker than the authentication protocol supported by the other element.

It would be desirable, therefore, to provide systems and methods for managing authentication between different elements in digital networks. It would be further desirable for the systems and methods to operate inline, i.e., without necessitating the first element to interact directly with the second. It would be still further desirable for the systems and methods to be operable even when the different elements support authentication protocols that are presumptively incompatible with each other.

SUMMARY OF THE DISCLOSURE

Aspects of the disclosure relate to systems and methods for providing a digital authentication architecture. The architecture may include one or more client nodes and one or more applications. Each of the applications may support an authentication protocol.

The architecture may also include an authentication adapter bridge ("AAB"). The AAB may be configured to receive an access request from a first client node. The access request may be requesting access to a target application from the one or more applications. The AAB may also be configured to provide an authentication pipeline between the first client node and the target application.

The authentication pipeline may facilitate an authentication stream that satisfies the authentication protocol that is supported by the target application. The authentication stream may satisfy the authentication protocol even when the first client node supports a different authentication protocol. The AAB may further be configured to authenticate the first client node to the target application via the authentication pipeline.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Traditional authentication schemes may include AAA (authentication, authorization, and auditing/approval) handshakes. The traditional authentication schemes may rely on bidirectional authentication with similar authentication types, e.g., via a push/push stream. Aspects of the disclosure relate to mid-way AAA handshakes that allow different authentication strings to be linked serially and/or in parallel. A mechanism is provided to bridge those presumptively incompatible means during an authentication and/or data stream.

Systems and methods for providing authentication between elements in a digital network are provided. Authentication may preferably be provided even when the elements are incompatible with each other. Elements may be presumptively incompatible when they support different authentication protocols. One authentication protocol may, in some scenarios, provide a higher level of authentication than the other authentication protocol.

A method may include receiving an access request from a client node in the network. A client node may be a device. A client node may be an application. A client node may be a web browser. A client node may be a user profile. A client node may be associated with a user who may be a member or a guest of the network. The access request may request access to an application in the network. The application may be a software program. The application may be a hardware component. The application may be a database, a website, or any other suitable digital application. Access to an application may include running the application, retrieving data from the application, storing data in the application, or any other suitable use that a client may request from an application.

The access request may be associated with a uniform resource identifier ("URI"). For example, the URI may be a uniform resource locator ("URL"). The URI may be transmitted along with the access request. The method may include extracting a target application from the URI. For example, the URI (e.g., a URL) may include predetermined portions for storing information relating to the access request, and one or more of those portions may indicate one or more target applications. The composition of the URI may be customized for the network, and may be designed to facilitate the storing and extracting of the information relating to the access request. The URI may be encrypted for increased security.

The method may include determining an authentication protocol that is supported by the target application. Determining an authentication protocol may involve searching a database that may store applications and their supported authentication protocols. Determining an authentication protocol may involve a rule-based approach that maps certain factors to certain authentication protocols. For example, an application that performs a certain function, has a certain production year, is associated with a certain level of security or sensitivity, or any other suitable factor, may be mapped to certain authentication protocols that suit that factor.

The method may include generating, based on the authentication protocol, a series of one or more authentication tests. The series of authentication tests may, individually or in combination, satisfy the authentication protocol. The authentication tests may satisfy the authentication protocol even when the client node natively (i.e., by default in the current state) supports a different authentication protocol. For example, the authentication protocol of the target application may utilize certain information. The native authentication protocol of the client node may not provide the requisite information. The authentication tests may obtain the requisite information in order to satisfy the authentication protocol of the target application.

Obtaining the requisite information may include querying the client node. Multiple authentication tests may obtain different parts of the requisite information. For example, a user profile may attempt to login to a secure application. The login credentials may be one authentication test. However, the attempted login may be on a device that is unrecognized or has a low level of security, and the secure application may require a relatively high level of security. In this scenario, the method may include additional authentication tests, e.g., obtaining an additional passcode, PIN, biometric confirmation, and/or any other suitable authentication information in order to satisfy the authentication threshold for the secure application.

One or more of the authentication tests may also be designed to protect against specific threats. For example, one of the tests may target malicious SQL injections, or any other threat that may be specified by the target application.

In certain embodiments, the client node may be one of a plurality of client nodes, and the method may further include amalgamating authentication data from the plurality of client nodes to authenticate one or more of the plurality of client nodes vis-à-vis the target application. For example, a certain user profile may attempt to access a secure website with somebody else's computing device. Based on the requirements of the secure website, the system may obtain a password from the user and various pieces of suitable authentication information from the computing device to satisfy the authentication requirements of the secure website.

The method may include executing the series of authentication tests to authenticate the client node vis-à-vis the target application.

The method may be operable for a wide range of authentication protocols that may be supported by the client node or the target applications. Some examples of authentication protocols may include:

SAML (Security Assertion Markup Language);
SSL (Secure Socket Layer) Mutual Auth;
Basic access authentication;
JWT (JSON Web Token);
SSL/TLS (Transport Layer Security) Offload Encryption (may include HSM—Hardware Security Module);
OAuth (Open Authorization);
OAuth 2.0;
Ping OAuth 2.0<OAuth 2.0>Token Validation;
Client ID enforcement;
Ping STS (Security Token Service)<ping STS>Token Validation;
IP White Listing;
UUM (Unified User Management) Token;
X.509 Certificate-Based; and
any other suitable authentication protocol. An authentication protocol may also include a combination of one or more other authentication protocols. An authentication protocol may also include a custom protocol that defines certain parameters or requirements that must be met to achieve authentication for the application.

In some embodiments, the target application may be one of a plurality of target applications. The method may further include executing the series of authentication tests to authenticate the client node vis-à-vis one or more of the plurality of target applications. For example, each authentication test individually may obtain the elements necessary to satisfy the authentication protocol of one of the target applications. Alternatively, multiple authentication tests together may satisfy the requirements of one or more of the target applications.

The method may, in some embodiments, further include generating a token and an associated token mapping for the access request. A token may be an identifier (e.g., an alphanumeric string) that is associated with the client node and/or the access request. The token may not include any sensitive or revealing information about the client node and the access request. Each token may be single-use. The token may be issued to the client node upon successful authentication, and may be used by the client node to gain access to one or more authorized destinations. The token mapping may include a scheme that governs the access for the client nodes and/or the access requests that each token authorizes, e.g., the client/request, resource, type of access, duration of access, etc., that is associated with each token. The token mapping may be, at least in part, implicit in the identifier string. The token mapping may be stored in a database.

The method may also include managing access between the client node and the target application based at least in part on the token and the token mapping. Token-based access may reduce the amount of sensitive information that is transmitted across and outside the network, and thereby increase the security of the system.

A digital authentication architecture is provided. The architecture may include one or more client nodes and one or more applications. Each of the applications may support an authentication protocol. The architecture may also include an authentication adapter bridge ("AAB").

The AAB may be configured to receive an access request from a first client node. The access request may request access to a target application from the one or more applications. The AAB may also be configured to provide an authentication pipeline between the first client node and the target application. The authentication pipeline may facilitate an authentication stream that satisfies the authentication protocol that is supported by the target application. The authentication stream may satisfy the authentication protocol even when the first client node supports a different authentication protocol. The AAB may further be configured to authenticate the first client node to the target application via the authentication pipeline.

In some embodiments, the authentication pipeline may be a multi-tiered authentication pipeline. A multi-tiered authentication pipeline may include a series of authentication modules. Each authentication module may be configured to administer one (or more) authentication test. The one (or more) authentication test may be selected from a series of authentication tests.

In certain embodiments, the AAB may be further configured to provide an amalgamated authentication pipeline. The amalgamated authentication pipeline may facilitate a combination of a plurality of authentication streams. The authentication streams may communicate authentication data that, in combination, satisfy the authentication protocol that is supported by the target application.

In some embodiments, the plurality of authentication streams may obtain the authentication data from a plurality of client nodes.

In certain embodiments, the AAB may be further configured to authorize the first client node to access a plurality of target applications. For example, the access request may request access to multiple applications. The AAB may tailor the set of authentication tests, based on the authentication requirements of each application, to facilitate authorization to all of the multiple applications. The authentication requirements for the plurality of applications may include one or more of the authentications protocols enumerated above, and/or any other suitable requirement for authentication.

In some embodiments, the access request may be associated with a uniform resource identifier ("URI"). The authentication pipeline may be associated with a routing that is based at least in part on information included in the URI.

For example, the URI may be a uniform resource locater ("URL"). An exemplary URL-based routing may include a URL of the format: "https://targethost.com:port/clientId/service/ . . . /". After the port number in the URL, the portion "clientId/service" may determine the routing logic of the target host and the type of authentication mechanism supported. This may provide the ability to support multiple targets within the same clientId. The check for URL and clientId may preferably be made as part of authentication and/or authorization before the request is routed.

The architecture may, in certain embodiments, further include a tokenization module. The tokenization module may include a token generator. The tokenization module may also include a database for storing tokens. The database may also store a mapping associated with each of the tokens. Access between the client nodes and the applications may be based at least in part on one or more of the tokens.

The AAB may, in some embodiments, be further configured to provide authentication, authorization, and auditing ("AAA") for the access request. For example, auditing may include generating a unique ID for each request, and logging the request associated with the unique ID. This may be useful for troubleshooting and other auditing purposes.

A method for providing authentication between presumptively incompatible elements in a digital network is provided. The method may include receiving an access request from a client node in the network. The access request may request access to a target application.

The method may include identifying an authentication protocol that is supported by the client node. The method may also include identifying an authentication protocol that is supported by the target application.

The method may include providing an authentication pipeline between the client node and the target application. The method may also include facilitating, via the authentication pipeline, an authentication stream that satisfies the authentication protocol that is supported by the target application. The authentication stream may satisfy the authentication protocol even when the client node supports a different authentication protocol. The method may further include authenticating the client node to the target application via the authentication pipeline.

In some embodiments of the method, the authentication pipeline may be a multi-tiered authentication pipeline, and the method may further include administering, via each tier of the multi-tiered authentication pipeline, one authentication test from among a series of authentication tests.

The method may, in certain embodiments, further include communicating authentication data via a plurality of authentication streams. The method may also include amalgamating the authentication data to satisfy the authentication protocol that is supported by the target application. In some embodiments, the method may include obtaining the authentication data from a plurality of client nodes.

The method may, in some embodiments, further include authorizing, via the authentication pipeline, the client node to access a plurality of target applications.

In certain embodiments, the access request may be associated with a uniform resource identifier ("URI"). The method may further include routing the authentication pipeline based at least in part on information included in the URI.

The method may, in some embodiments, further include generating a token and an associated token mapping for the access request. The method may also include managing access between the client node and the target application based at least in part on the token and the token mapping.

In some embodiments, the method may further include providing authentication, authorization, and auditing ("AAA") for the access request.

Thus, aspects of the disclosure may provide a AAA Bridge that supports a mid-stream (i.e., without the requesting node communicating directly to the target application) AAA bridging. The AAA Bridge may also support a prestream AAA bridging with relatively weaker authentication protocols. AAA streams may also, in some embodiments, be broken into sub-secondary streams to allow multiple downstream devices or systems. This may allow a user to create multi-block authorization tailored to each system.

The AAA Bridge may also provide in-flight (i.e., real-time) determination of the type of authentication supported by the client on other end of request to bridge between the two parties. The determination may be based at least in part on an associated authentication policy for client nodes. The policies may be stored in a database. Requests may be monitored, and, based on an identifier (which can be part of a URL, custom header, or other URI), the system may automatically retrieve the associated policy and determine the type of authentication supported by the target client. Accordingly, the request may be addressed in real-time to establish the connection.

Furthermore, multiple portions of a URL (e.g., " . . . /clientId/service/ . . . ") may provide information that may be translated to support multiple combinations (different environments, different targets etc.) for the same client.

The AAA Bridge may also provide the ability to connect/bridge multiple clients from weaker authentications (e.g., SSL-mutual auth) to stronger authentications (e.g., oAuth 2) with different supported authentication types. For example, there are times when a user has a weaker authentication and wants to connect to a stronger authentication post. The AAA bridge may be able to act as a multi-factor entry for more than one authentication scheme, allowing the user to "enter" a more secure edge/perimeter zone.

Bridging logic may be provided to enable authentication services between different kinds of authentication mechanisms by dynamically converting one mechanism to another at runtime. Instead of authenticating directly to each other, consumer programs and services may connect to a broker, which provides bridging logic that carries out the authentication conversion.

The consumer programs may interact with a middle-tier broker that provides authenticating bridging features. Separate authenticating adapters may be used to translate the incompatible mechanism to the required authentication mechanism. The broker may then communicate with the services for establishing the authentication mechanism.

Once authentication is established, the broker system may generate a token to connect with the consumer. A corresponding mechanism mapper may map the token in the broker system.

In one exemplary implementation, the system may utilize SSL (Secure Sockets Layer) Mutual Auth and HSM (hardware security module) Offloading via Connection Inspection. The exemplary implementation may include using a Custom IRULE on LTM (Local Traffic Manager) that may inspect Client SSL negotiation on LTM. It may extract Certificate expiry, Certificate Common name, and/or serial number. If the certificate is expired, or not part of an approved trust store, the connection may be rejected. If a valid certificate is presented, certification information may be extracted and added to HTTP (HyperText Transfer Protocol) payload along with IP (Internet Protocol) address and Protocol TLS Information for authentication against custom entitlements for that client. Client communication may terminate on LTM Edge where certificates may be stored in HSM.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
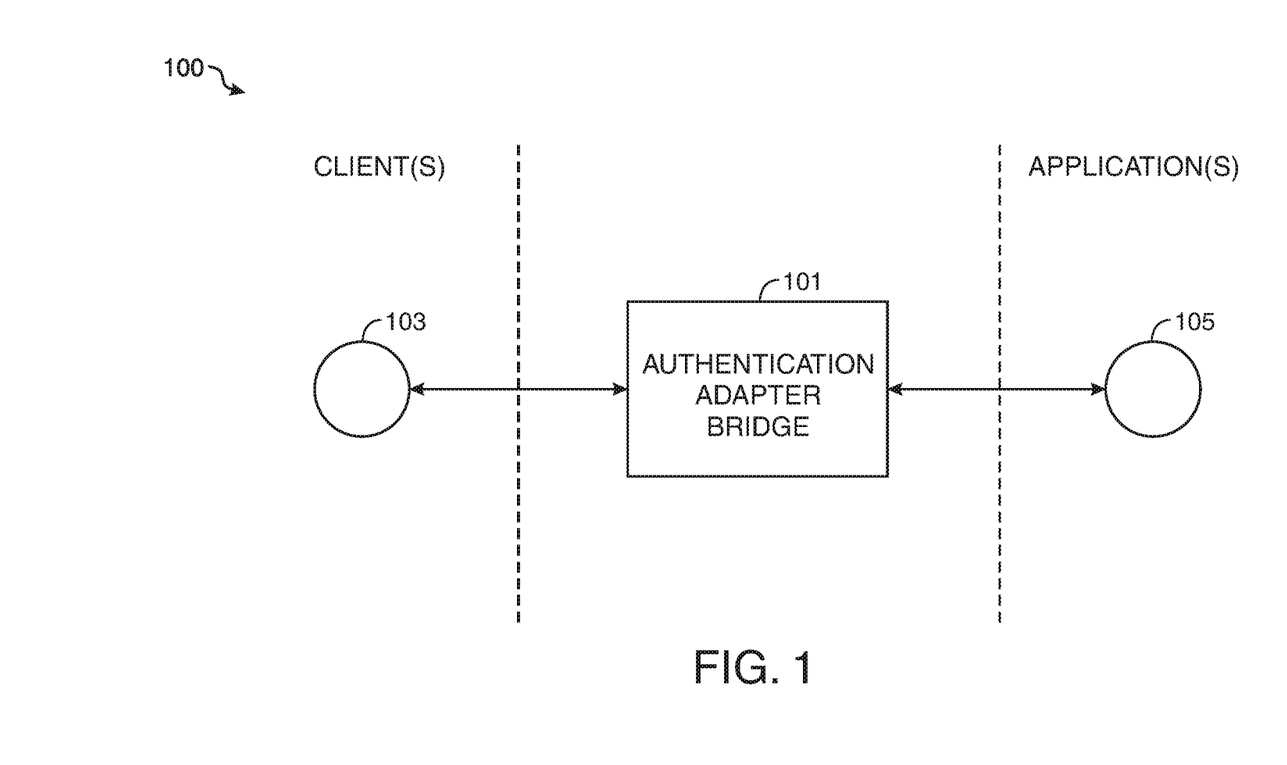
FIG. 1 shows an illustrative system architecture in accordance with principles of the disclosure.

FIG. 1 shows illustrative system architecture 100 according to aspects of the disclosure. Architecture 100 shows an authentication adapter bridge ("AAB") 101. AAB 101 may connect a client node 103 with a target application 105. AAB 101 may provide an authentication bridge for authenticating client node 103 to target application 105. AAB 101 may be configured to provide the authentication even when client node 103 and target application 105 support authentication protocols that are by default incompatible.

Figure 2:
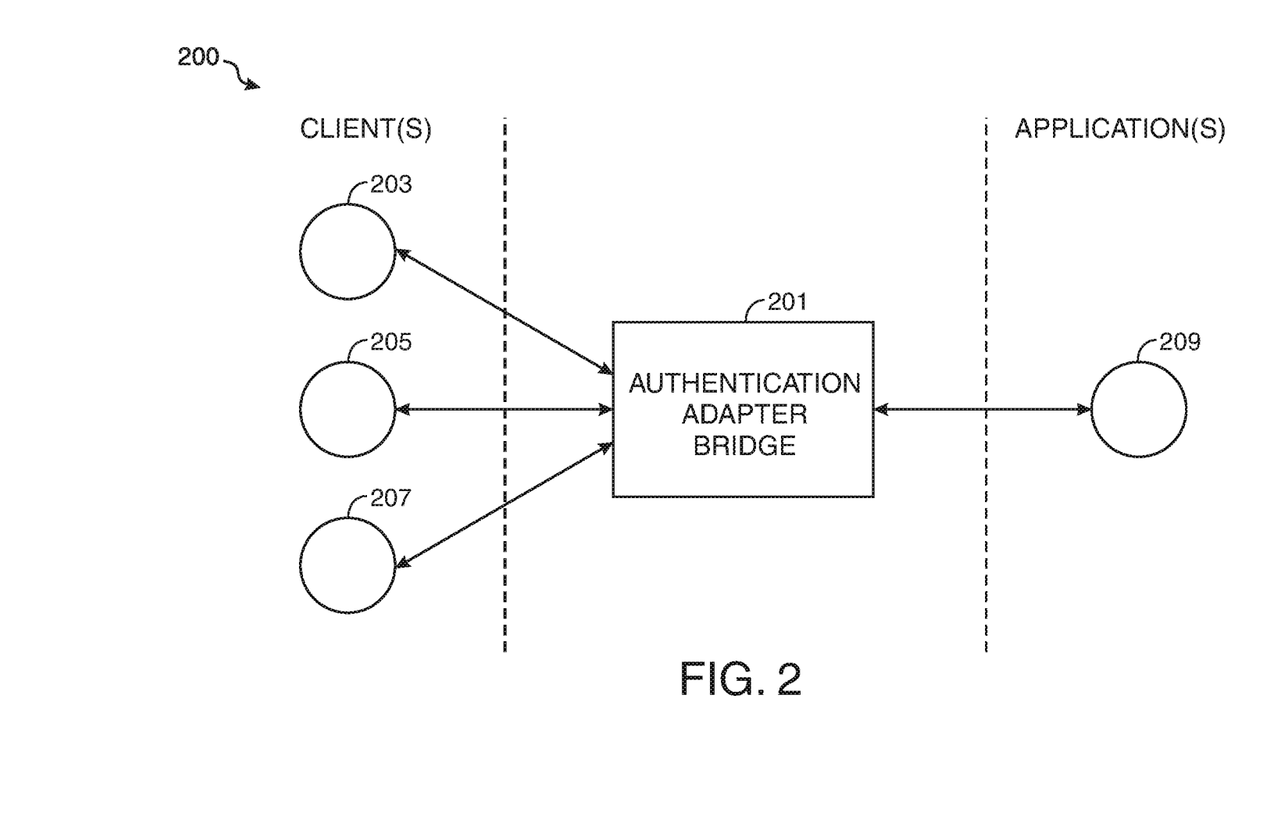
FIG. 2 shows another illustrative system architecture in accordance with principles of the disclosure.

FIG. 2 shows illustrative system architecture 200 according to aspects of the disclosure. Architecture 200 shows an authentication adapter bridge ("AAB") 201. AAB 201 may connect elements 203-207 with a target application 209. Elements 203-207 may be different parts (logically or physically) of the same client node, or they may be different client nodes. AAB 201 may provide an authentication bridge for authenticating elements 203-207 to target application 209. AAB 201 may be configured to provide the authentication even when elements 203-207 and target application 209 support incompatible authentication protocols. AAB 201 may obtain authentication data from elements 203-207 via a series of authentication tests. The series of authentication tests may be constructed based on the authentication protocol supported by target application 209. AAB 201 may provide the authentication at least in part by amalgamating the authentication data obtained from elements 203-207.

Figure 3:
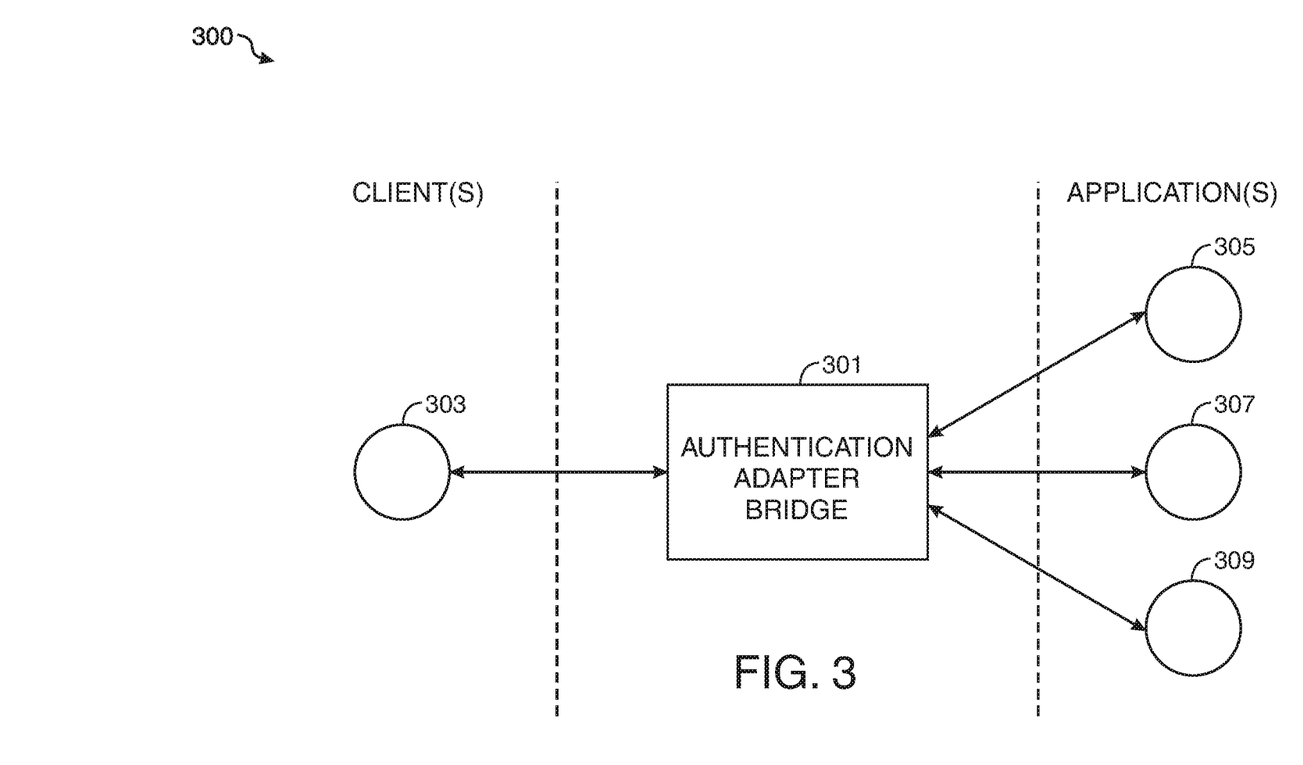
FIG. 3 shows yet another illustrative system architecture in accordance with principles of the disclosure.

FIG. 3 shows illustrative system architecture 300 according to aspects of the disclosure. Architecture 300 shows an authentication adapter bridge ("AAB") 301. AAB 301 may connect a client node 303 with a target application 105. AAB 101 may provide an authentication bridge for authenticating client node 103 to target applications 305-309. AAB 301 may be configured to provide the authentication even when client node 303 and target applications 305-309 support incompatible authentication protocols.

Figure 4:
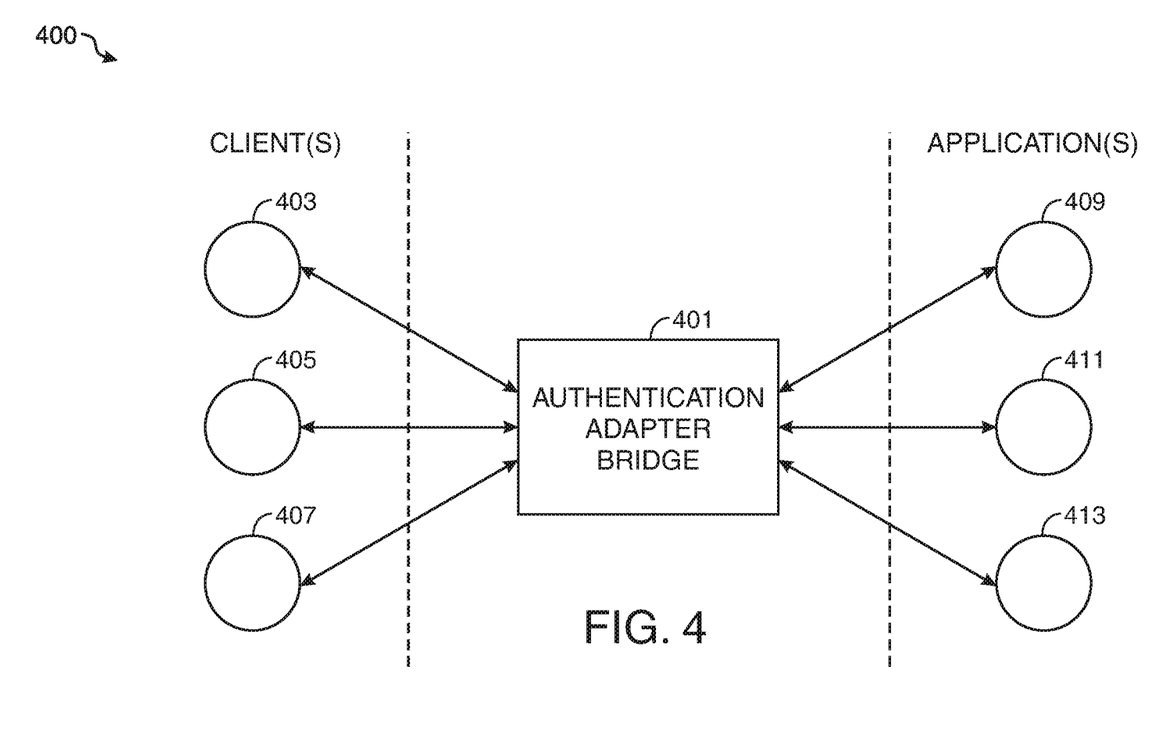
FIG. 4 shows still another illustrative system architecture in accordance with principles of the disclosure.

FIG. 4 shows illustrative system architecture 400 according to aspects of the disclosure. Architecture 400 shows an authentication adapter bridge ("AAB") 401. AAB 401 may connect elements 403-407 with target applications 409-413. Elements 403-407 may be different parts of the same client node, or they may be different client nodes. AAB 401 may provide an authentication bridge for authenticating elements 403-407 to target applications 409-413. AAB 401 may be configured to provide the authentication even when elements 403-407 and target applications 409-413 support incompatible authentication protocols. Providing the authentication may include amalgamating authentication data obtained from elements 403-407. An AAB according to the disclosure may be configured to provide authentication for one, some, or all of the scenarios shown in FIGS. 1-4.

Figure 5:
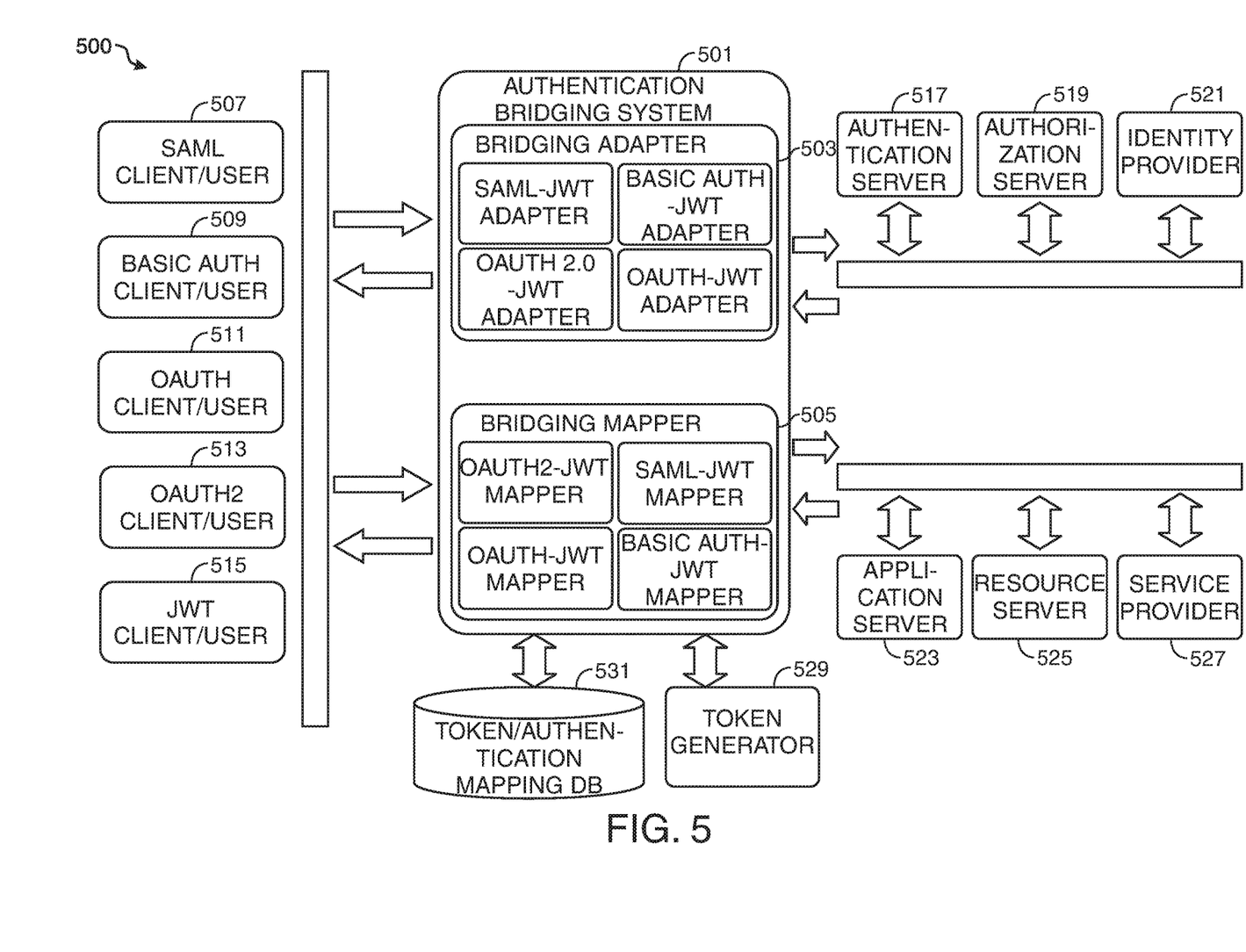
FIG. 5 shows another illustrative diagram in accordance with principles of the disclosure.

FIG. 5 shows illustrative diagram 500 according to aspects of the disclosure. Diagram 500 shows Authentication Bridging System (ABS) 501. ABS (otherwise referred to herein as AAB, AAA bridge, bridging adapter, authentication adapter, and other similar terms) 501 may be configured to take a master input from various AAA external streams (e.g., from one or more of elements 507-515) and create a tokenized main AAA stream (MAAAS). This MAAAS can be then converted to a Secondary AAA stream (SAAAS) that may be compatible with a downstream system.

The MAAAS or SAAAS may be created using bridging adapter 503 and/or bridging mapper 505. Bridging adapter 503 may use information stored in bridging mapper 505 to convert from authentication protocols supported by client nodes (e.g., one or more of elements 507-515) to authentication protocols supported by one or more of target applications 517-527.

Elements 507-515 may support various authentication protocols. For example, element 507 may be a SAML client. Element 509 may be a Basic Auth client. Element 511 may be an OAuth client. Element 513 may be an OAuth2 client. Element 515 may be a JWT client.

Actual routing of the MAAAS or SAAAS may include the use of tokens. Using tokens may involve token generator 529 and/or token/authentication mapping database 531.

The MAAAS or SAAAS may also be broken into sub secondary streams to allow access to multiple downstream devices or systems (e.g., one or more of applications 517-527). Applications 517-521 may be servers that provide authentication and/or authorization. Applications 523-527 may be servers that provide resources, functional applications, and/or services. The system may need to access one or more of applications 517-521 as a prerequisite for accessing one or more of applications 523-527.

This may allow a user to create a multi-block authorization tailored to each system to prevent abuse of AAA leak.

AAA leak can occur when part of the AAA stream is fed downstream potentially exposing the AAA stream to a Man-In-The-Middle attack.

Figure 6:
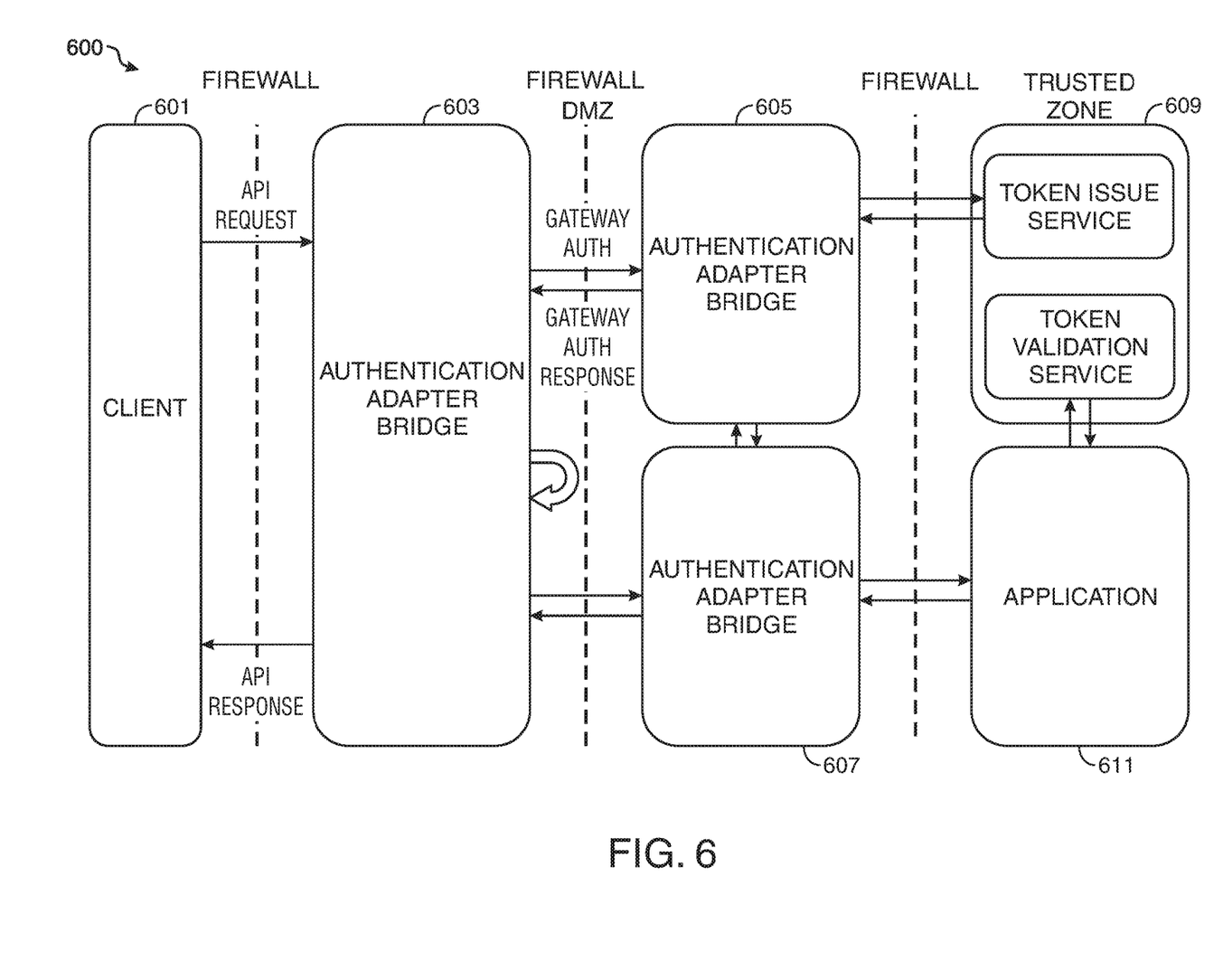
FIG. 6 shows yet another illustrative diagram in accordance with principles of the disclosure.

FIG. 6 shows illustrative diagram 600 according to aspects of the disclosure. Diagram 600 shows one exemplary implementation of an authentication architecture within a digital network.

Client 601 may request access to application 611. Client 601 may be located outside one or more firewalls of a network. Application 611 may be located behind one or more firewalls of the network.

Authentication Adapter Bridge ("AAB") 603 may receive the request. AAB 603 may be in a DMZ ("demilitarized zone," or semi-protected location) that may be behind at least one of the firewalls in the network. Diagram 600 may show communication between elements as represented by arrows. Arrows may exist in both directions between elements, to show bidirectional communication. The bidirectional communication may include a request and a response to or acknowledgment of the request. Communication may involve HTTPS (Hyper Text Transfer Protocol Secure).

AAB 603 may communicate with AAB services 605. AAB services 605 may be in a more protected location in the network. AAB services 605 may provide services for AAB 603. The services may relate to facilitating authentication for client 601. Services may include communicating with tokenization components 609. Tokenization components 609 may include a token issue service and a token validation service. AAB 603 and/or AAB services 605 may communicate with AAB 607, which may be in a more secure location than AAB 603, to authenticate client 601 vis-à-vis application 611. AAB 603 and AAB 607 may represent two tiers of a multi-tier AAB. The two tiers may be responsible for different authentication tests and/or obtaining different information, for satisfying the authentication protocol of application 611.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for split-tiered point-to-point inline authentication architecture are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for authenticating a client node that is requesting access to an application in a digital network, said method comprising:
   receiving an access request from the client node, said access request associated with a uniform resource identifier ("URI");
   extracting a target application from the URI;
   determining, in real-time, an authentication protocol that is supported by the target application;
   determining that a native authentication protocol of the client node is less secure than the authentication protocol;
   determining one or more areas of deficiency of the native authentication protocol that cause the native authentication protocol to be less secure than the authentication protocol;
   generating a series of one or more authentication tests that, in combination, satisfy the authentication protocol and cure the one or more areas of deficiency of the native authentication protocol; and
   executing the series of authentication tests to authenticate the client node vis-à-vis the target application.

2. The method of claim 1, wherein the target application is one of a plurality of target applications, and the method further comprises executing the series of authentication tests to authenticate the client node vis-à-vis one or more of the plurality of target applications.

3. The method of claim 1, wherein the client node is one of a plurality of client nodes, and the method further comprises amalgamating authentication data from the plurality of client nodes to authenticate one or more of the plurality of client nodes vis-à-vis the target application.

4. The method of claim 1, further comprising:
   generating a token and an associated token mapping for the access request; and
   managing access between the client node and the target application based at least in part on the token and the token mapping.

5. A digital authentication architecture, said architecture comprising:
   one or more client nodes;
   one or more applications, each of the applications supporting an authentication protocol; and
   an authentication adapter bridge ("AAB"), wherein said AAB is configured to:
      receive an access request from a first client node, said access request requesting access to a target application from the one or more applications;
      provide, in real-time, an authentication pipeline between the first client node and the target application, said authentication pipeline that facilitates an authentication stream that satisfies the authentication protocol that is supported by the target application, said authentication stream satisfying the authentication protocol even when the first client node is associated with a native authentication protocol that is less secure than the authentication protocol, said authentication stream curing one or more areas of deficiency of the native authentication protocol that cause the native authentication protocol to be less secure than the authentication protocol; and authenticate the first client node to the target application.

6. The architecture of claim 5, wherein the authentication pipeline is a multi-tiered authentication pipeline, said multi-tiered authentication pipeline comprising a series of authentication modules, each authentication module configured to administer one authentication test from a series of authentication tests.

7. The architecture of claim 5, wherein the AAB is further configured to provide an amalgamated authentication pipeline, said amalgamated authentication pipeline facilitating a combination of a plurality of authentication streams, the authentication streams communicating authentication data that, in combination, satisfy the authentication protocol that is supported by the target application.

8. The architecture of claim 7, wherein the plurality of authentication streams obtain the authentication data from a plurality of client nodes.

9. The architecture of claim 5, wherein the AAB is further configured to authorize the first client node to access a plurality of target applications.

10. The architecture of claim 5, wherein the access request is associated with a uniform resource identifier ("URI"), and the authentication pipeline is associated with a routing that is based at least in part on information included in the URI.

11. The architecture of claim 5, further comprising a tokenization module, said tokenization module comprising a token generator and a database for storing tokens and a mapping associated with each of said tokens, and wherein access between the client nodes and the applications is based at least in part on one or more of the tokens.

12. The architecture of claim 5, wherein the AAB is further configured to provide authentication, authorization, and auditing ("AAA") for the access request.

13. A method for providing authentication between presumptively incompatible elements in a digital network, said method comprising:

receiving an access request from a client node in the network, said access request requesting access to a target application;

identifying an authentication protocol that is supported by the client node;

identifying, in real-time, an authentication protocol that is supported by the target application;

determining that a native authentication protocol supported by the client node is less secure than the authentication protocol;

determining one or more areas of deficiency of the native authentication protocol that cause the native authentication protocol to be less secure than the authentication protocol;

providing an authentication pipeline between the client node and the target application;

facilitating, via the authentication pipeline, an authentication stream that satisfies the authentication protocol that is supported by the target application, said authentication stream curing the one or more areas of deficiency of the native authentication protocol; and authenticating the client node to the target application via the authentication pipeline.

14. The method of claim 13, wherein the authentication pipeline is a multi-tiered authentication pipeline, and the method further comprises administering, via each tier of the multi-tiered authentication pipeline, one authentication test from among a series of authentication tests.

15. The method of claim 13, further comprising:

communicating authentication data via a plurality of authentication streams; and amalgamating the authentication data to satisfy the authentication protocol that is supported by the target application.

16. The method of claim 15, further comprising obtaining the authentication data from a plurality of client nodes.

17. The method of claim 13, further comprising authorizing, via the authentication pipeline, the client node to access a plurality of target applications.

18. The method of claim 13, wherein the access request is associated with a uniform resource identifier ("URI"), and the method further comprises routing the authentication pipeline based at least in part on information included in the URI.

19. The method of claim 13, further comprising:

generating a token and an associated token mapping for the access request; and managing access between the client node and the target application based at least in part on the token and the token mapping.

20. The method of claim 13, further comprising providing authentication, authorization, and auditing ("AAA") for the access request.

* * * * *